US011929025B2

(12) United States Patent
Lee et al.

(10) Patent No.: US 11,929,025 B2
(45) Date of Patent: Mar. 12, 2024

(54) DISPLAY DEVICE COMPRISING PIXEL DRIVING CIRCUIT

(71) Applicant: LG Display Co., Ltd., Seoul (KR)

(72) Inventors: Dongkyu Lee, Paju-si (KR); Wookyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/981,196

(22) Filed: Nov. 4, 2022

(65) Prior Publication Data

US 2023/0215359 A1 Jul. 6, 2023

(30) Foreign Application Priority Data

Dec. 31, 2021 (KR) ........................ 10-2021-0194792

(51) Int. Cl.

*G09G 3/32* (2016.01)
*G09G 3/20* (2006.01)
*G09G 3/3233* (2016.01)

(52) U.S. Cl.

CPC ......... *G09G 3/3233* (2013.01); *G09G 3/2007* (2013.01); *G09G 2300/0819* (2013.01); *G09G 2300/0842* (2013.01); *G09G 2300/0861* (2013.01); *G09G 2310/0294* (2013.01); *G09G 2310/08* (2013.01); *G09G 2320/0247* (2013.01); *G09G 2330/021* (2013.01)

(58) Field of Classification Search

CPC ... G09G 2300/0819; G09G 2300/0842; G09G 2300/0861; G09G 2310/08; G09G 2320/0247; G09G 3/2007; G09G 3/30–3291

See application file for complete search history.

(56) References Cited

U.S. PATENT DOCUMENTS

| | | | | |
|---|---|---|---|---|
| 10,916,198 | B2 | 2/2021 | Lin et al. | |
| 10,937,370 | B2 | 3/2021 | Son | |
| 11,282,462 | B2 | 3/2022 | Lin et al. | |
| 2013/0321479 | A1* | 12/2013 | Ka | G09G 3/3241 345/77 |
| 2018/0005576 | A1* | 1/2018 | Yoon | G09G 3/3233 |
| 2020/0226978 | A1* | 7/2020 | Lin | H01L 29/7869 |
| 2021/0174744 | A1* | 6/2021 | Li | G09G 3/3233 |
| 2022/0180812 | A1 | 6/2022 | Lin et al. | |

FOREIGN PATENT DOCUMENTS

| | | | |
|---|---|---|---|
| KR | 20200057204 | A | 5/2020 |
| KR | 102281222 | B1 | 7/2021 |

* cited by examiner

*Primary Examiner* — Roy P Rabindranath
(74) *Attorney, Agent, or Firm* — Seed IP Law Group LLP

(57) ABSTRACT

Disclosed is a display device comprising a light emitting element, and a pixel driving circuit connected to the light emitting element and configured to include first to fourth nodes, wherein the pixel driving circuit includes a driving transistor connected to the first to third nodes, a plurality of switching transistors, a storage capacitor, and a plurality of signals and voltage lines, wherein an initialization voltage applied through an initialization line among the plurality of signals and voltage lines is varied based on a data voltage.

17 Claims, 10 Drawing Sheets

DISPLAY DEVICE COMPRISING PIXEL DRIVING CIRCUIT

CROSS-REFERENCE TO RELATED APPLICATION

This application claims priority benefit to Korean Patent Application No. 10-2021-0194792, filed Dec. 31, 2021, the entirety of which is hereby incorporated by reference.

BACKGROUND

Technical Field

The present disclosure relates to a display device comprising a pixel driving circuit.

Description of the Related Art

With the development of information technology, a market of a display device, which is a connection medium between a user and information, increases. Various forms of communication have been actively developed beyond the transfer of text-centric information between users. According as the type of information changes, the performance of display device for displaying information has also been developed. Accordingly, display devices such as an organic light emitting display device, a micro LED display device, a liquid crystal display device, and a quantum dot display device have been variously used, and a high definition display device for increasing sharpness of information has been actively studied and developed.

A display device includes a display panel including a plurality of subpixels, a driving circuit for supplying a signal for driving the display panel, and a power supply portion for supplying power to the display panel. The driving circuit includes a gate driving circuit for supplying a gate signal to the display panel and a data driving circuit for supplying a data signal to the display panel.

For example, when the gate signal and the data signal are supplied to the subpixel of the display device, the display device may display an image by allowing a light emitting element of the selected subpixel to emit light. The light emitting element may be implemented based on an organic material or an inorganic material.

The display device displays an image based on light generated from the light emitting element of the subpixel.

The above content of the background technology provides technology information learned by practice of embodiments of the present disclosure. However, the above content of the background technology description is not admitted as prior art and it may qualify as prior art published to the general public before an application of the present disclosure.

BRIEF SUMMARY

The inventors have realized it is possible to improve a picture quality of the image by improving the operation of a pixel driving circuit for controlling a light emission in the subpixel. For example, the accuracy of the pixel driving circuit may be improved by compensating for a threshold voltage of a driving transistor included in the pixel driving circuit. As the resolution of the display device increases and power consumption increases, a driving technique for reducing power consumption of the display device has been developed. In order to reduce power consumption, the pixels may be driven at a low speed by decreasing a frame rate during a specific period. For example, in the case of a mobile model, power consumption may be reduced by performing a normal driving at a frequency of 60 Hz, 120 Hz in an actual mode and performing a low-speed driving at a frequency of 1 Hz in a standby mode.

In order to mitigate the hysteresis phenomenon of the drive transistor and to improve the initial frame response characteristic, the pixel driving circuit performs an on-bias stress OBS step of biasing source and gate electrodes of the driving transistor to a predetermined data voltage before sampling a threshold voltage of the driving transistor. However, if the data voltage applied for the on-bias stress step is increased, an effect of improving the initial frame response characteristic may be obtained, but an emission step may be affected by the data voltage applied to the driving transistor, which may cause a problem of increasing a black luminance.

In order to solve the above-mentioned problems, inventors of the present disclosure have confirmed that the data voltage required for the on-bias stress operation may be sufficiently lowered when the initialization step is first performed before the on-bias stress step, to thereby overcome the problem related with the increase of the black luminance. However, the threshold voltage variation ΔVth is largely generated by the gate-source voltage VGS of the driving transistor according to the on-bias stress operation immediately after the initialization step. In order to overcome the flicker phenomenon, it is important to reduce the deviation of the threshold voltage variation ΔVth by the subsequent on-bias stress step. Thus, the inventors of the present disclosure have invented a pixel driving circuit and a display device comprising the same, which may reduce the deviation of the threshold voltage regardless of the gate-source voltage VGS of the driving transistor by the on-bias stress operation and may overcome the flicker phenomenon at the low grayscale level.

The present disclosure has been made in view of the above problems, and it is an object of the present disclosure to provide a display device comprising a pixel driving circuit capable of reducing a deviation of a threshold voltage regardless of a gate-source voltage VGS of a driving transistor by an on-bias stress operation and overcoming the flicker phenomenon at a low grayscale level.

In accordance with an aspect of the present disclosure, the above and other objects can be accomplished by the provision of a display device comprising a light emitting element, and a pixel driving circuit connected to the light emitting element and configured to include first to fourth nodes, wherein the pixel driving circuit includes a driving transistor connected to the first to third nodes, a first transistor connected to a first control signal line and connected to the first node and the third node, a second transistor connected to a second control signal line and connected between the second node and a data line, a third transistor connected to an emission control signal line and connected between the second node and a first driving voltage line, a fourth transistor connected to the emission control signal line and connected between the third node and the fourth node, a fifth transistor connected to a third control signal line and connected between the third node and a first initialization voltage line, a sixth transistor connected to the third control signal line and connected between the fourth node and a second initialization voltage line, and a storage capacitor disposed between the first driving voltage line and the first node, wherein an initialization voltage applied through the first initialization voltage line is varied, namely will have a different value, based on a data voltage applied through the data line.

In addition to the effects of the present disclosure as mentioned above, additional advantages and features of the present disclosure will be clearly understood by those skilled in the art from the above description of the present disclosure.

BRIEF DESCRIPTION OF THE SEVERAL VIEWS OF THE DRAWINGS

The above and other objects, features and other advantages of the present disclosure will be more clearly understood from the following detailed description taken in conjunction with the accompanying drawings, in which.

DETAILED DESCRIPTION

Figure 1:
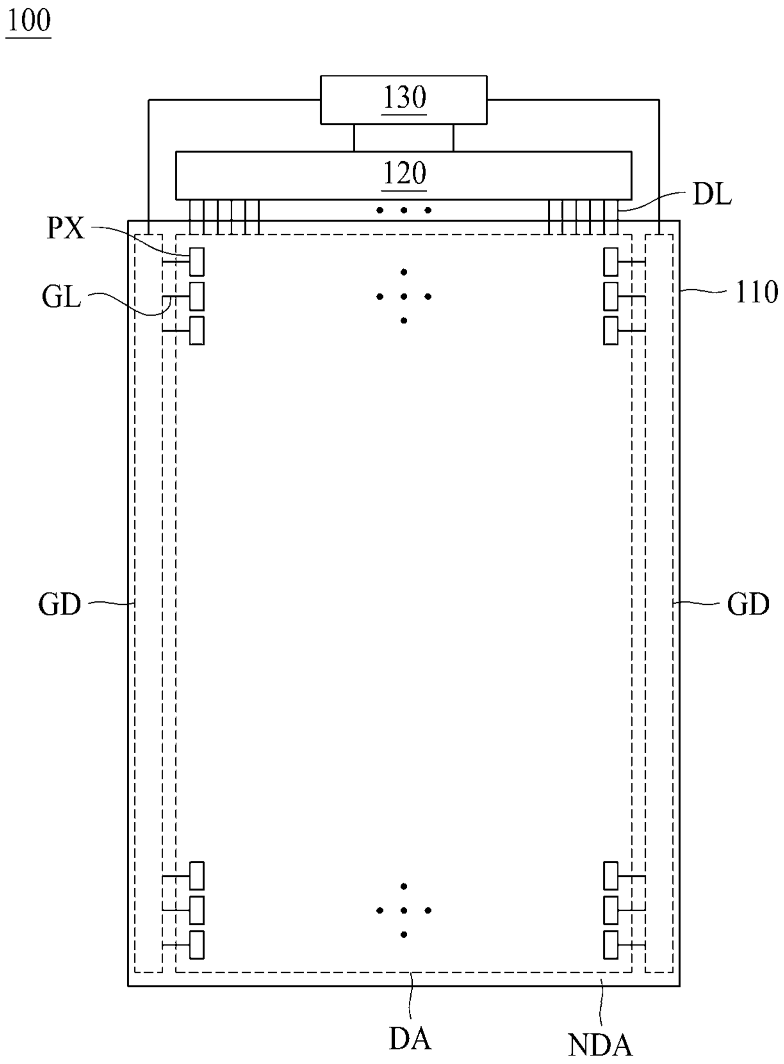
FIG. 1 is a block diagram of a display device according to the embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first," "second," etc., may be used herein to describe various elements, these elements should not be limited by these terms. These terms are only used to partition one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a preferred embodiment of a pixel driving circuit and a display device comprising the same according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

In the present specification, a pixel driving circuit and a gate driving circuit formed on a substrate of a display panel may be implemented as N-type or P-type transistors. For example, the transistor may be implemented as the transistor with N-type or P-type Metal Oxide Semiconductor Field Effect Transistor (MOSFET) structure. The transistor is a three-electrode element including a gate electrode, a source electrode, and a drain electrode. The source electrode and the drain electrode of the transistor are not fixed, and the source electrode and the drain electrode of the transistor may be changed according to an applied voltage. For example, one of the source electrode or the drain electrode may be referred to as a first source/drain electrode, and the other may be referred to as a second source/drain electrode, but not limited thereto.

A gate signal of the transistor used as switching elements may swing between a gate-on voltage and a gate-off voltage. The gate-on voltage is set to a voltage at which the transistor is turned-on, and the gate-off voltage is set to a voltage at which the transistor is turned-off. In the case of N-type transistor, the gate-on voltage may be a gate high voltage VGH having a first voltage level, and the gate-off voltage may be a gate low voltage VGL having a second voltage level lower than the gate high voltage VGH. In the case of P-type transistor, the gate-on voltage may be a gate low voltage VGL having a second voltage level, and the gate-off voltage may be a gate high voltage VGH having a first voltage level.

FIG. 1 is a block diagram of a display device according to the embodiment of the present disclosure.

Referring to FIG. 1, the display device 100 according to the embodiment of the present disclosure may include a display panel 110 in which a plurality of data lines DL and a plurality of gate lines GL are disposed and a plurality of pixels PX connected to the plurality of data lines DL and the plurality of gate lines GL are arranged, and driving circuits for providing a driving signal to the display panel 110.

Although it is illustrated that the plurality of pixels PX are arranged in a matrix configuration and constitute a pixel array, the present disclosure is not limited thereto, and the pixels may be arranged in the various configurations.

The driving circuit may include a data driving circuit 120 for providing a data signal to the plurality of data lines DL, a gate driving circuit GD for providing a gate signal to the plurality of gate lines GL, a controller 130 (or timing controller) for controlling the data driving circuit 120 and the gate driving circuit GD.

The display panel 110 may include a display area DA for displaying an image and a non-display area NDA disposed in the periphery of the display area DA. In the display area DA, there are the plurality of pixels PX, the data line DL for providing the data signal to the plurality of pixels PX and the gate line GL for providing the gate signal.

The plurality of gate lines GL disposed in the display area DA may extend to the non-display area NDA and may be electrically connected to the gate driving circuit GD. The gate line GL electrically connects the plurality of pixels PX disposed in the first direction (or row direction) to the gate driving circuit GD. Additionally, gate driving lines required to generate various gate signals or to drive the plurality of pixels PX may be disposed in the non-display area NDA. For example, the gate driving lines may include one or more high-level gate voltage lines for supplying the high-level gate voltage to the gate driving circuit GD, one or more low-level gate voltage lines for supplying the low-level gate voltage to the gate driving circuit GD, a plurality of clock lines for supplying a plurality of clock signals to the gate driving circuit GD, and one or more start lines for supplying one or more start signals to the gate driving circuit GD.

The plurality of data lines DL disposed in the display area DA may extend to the non-display area NDA and may be electrically connected to the data driving circuit 120. The data line DL may electrically connect the data driving circuit 120 to the plurality of pixels PX disposed in the second direction (or column direction) crossing the first direction, may be implemented as a single wire, or may be implemented by connecting a plurality of wirings through a contact hole using a link line.

In the display panel 110, the plurality of data lines DL and the plurality of gate lines GL are disposed together with the pixel array. As described above, the plurality of data lines DL and the plurality of gate lines GL may be arranged in rows or columns, respectively. For convenience of description, it is assumed that the plurality of data lines DL are arranged in columns, and the plurality of gate lines GL are arranged in rows.

The controller 130 (or timing controller) may start scanning the data signal according to the timing implemented in each frame, convert input image data input from the outside in accordance with a data signal format used in the data driving circuit 120, output the converted image data, and control the data driving circuit 120 at the appropriate time in accordance with the scan.

The controller 130 may receive timing signals including a vertical synchronization signal, a horizontal synchronization signal, an input data enable signal, a clock signal, etc., together with the input image data from the outside. The controller 130 receiving the timing signals may generate and output control signals for controlling the data driving circuit 120 and the gate driving circuit GD.

For example, the controller 130 may output various data control signals including a source start pulse, a source sampling clock, a source output enable signal, and the like to control the data driving circuit 120. The source start pulse may control the data sampling start timing of one or more data signal generation circuits constituting the data driving circuit 120. The source sampling clock is a clock signal for controlling the sampling timing of data in each of the data signal generation circuits. The source output enable signal may control the output timing of the data driving circuit 120.

In addition, the controller 130 may output a gate control signal including a gate start pulse, a gate shift clock, a gate output enable signal, etc., to control the gate driving circuit GD. The gate start pulse may control the operation start timing of one or more gate signal generation circuits constituting the gate driving circuit GD. The gate shift clock, which is a clock signal commonly input to one or more gate signal generation circuits, may control the shift timing of a scan signal. The gate output enable signal determines timing information of one or more gate signal generation circuits.

The controller 130 may be a timing controller used in a typical display device technology or a control device including a timing controller to further perform other control functions.

The controller 130 may be implemented as a separate component from the data driving circuit 120 or may be integrated with the data driving circuit 120 and implemented as one integrated circuit.

The data driving circuit 120 may include one or more data signal generation circuits. The data signal generation circuit may include a shift register, a latch circuit, a digital-to-analog converter, an output buffer, and the like. The data signal generation circuit may further include an analog-to-digital converter, if needed.

The data signal generation circuit may be connected to a bonding pad of the display panel 110 by a tape automated bonding TAB method, a chip on glass COG method, or a chip on panel COP method, or may be directly disposed on the display panel 110 or integrated with the display panel 110. Also, the plurality of data signal generation circuits may be implemented in a chip on film COF method mounted on a source-circuit film connected to the display panel 110.

The gate driving circuit GD sequentially supplies the gate signal to the plurality of gate lines GL, thereby driving the plurality of pixels PX connected to the plurality of gate lines GL. The gate driving circuit GD may include a shift register, a level shifter, and the like.

The gate driving circuit GD may be connected to the bonding pad of the display panel 110 by a tape automated bonding TAB method, a chip on glass COG method, or a chip on panel COP method, or may be implemented as a gate in panel GIP method and may be directly disposed on the display panel 110. Also, the plurality of gate signal generation circuits may be mounted on a gate-circuit film connected to the display panel 110 and may be implemented in a chip on film COF method. The gate driving circuit GD may include the plurality of gate signal generating circuits, and the plurality of gate signal generating circuits may be implemented in a GIP method and may be disposed in the non-display area NDA of the display panel 110.

Under the control of the controller 130, the gate driving circuit GD may sequentially supply the gate signal having the gate high voltage VGH with the first voltage level for turning on or off the transistor or the gate signal having the gate low voltage VGL with the second voltage level for turning on or off the transistor to the plurality of gate lines GL. When the signal is provided to the specific gate line by the gate driving circuit GD, the data driving circuit 120 may convert the image data received from the controller 130 into an analog data signal and supply the analog data signal to the plurality of data lines DL.

The data driving circuit 120 may be disposed at one side of the display panel 110. For example, the data driving circuit 120 may be disposed at an upper side, a lower side, a left side, or a right side of the display panel 110. In addition, the data driving circuit 120 may be disposed at both sides of the display panel 110 according to a driving method, a panel design method, or the like. For example, the data driving circuit 120 may be disposed at the upper side and the lower side of the display panel 110 or may be disposed at the left side and the right side of the display panel 110.

The gate driving circuit GD may be disposed at one side of the display panel 110. For example, the gate driving circuit GD may be disposed at an upper side, a lower side, a left side, or a right side of the display panel 110. In addition, the gate driving circuit GD may be disposed at both sides of the display panel 110 according to a driving method, a panel design method, or the like. For example, the gate driving circuit GD may be disposed at the upper side and the lower side of the display panel 110 or may be disposed at the left side and the right side of the display panel 110. The gate driving circuit GD may be formed in the left and/or right non-display area NDA of the substrate together with the thin film transistor of the pixel PX through the process of manufacturing the thin film transistor of the pixel PX, and may operate according to a single feeding method to supply the gate signal to each of the plurality of gate lines GL. Alternatively, the gate driving circuit GD may be formed in the left and right non-display areas NDA of the substrate, respectively, and may operate according to a double feeding method to supply the gate signal to each of the plurality of gate lines GL. Alternatively, the gate driving circuit GD may be formed in each of the left and right non-display areas NDA of the substrate, respectively, and may operate according to an interlacing method of the double feeding method to supply the gate signal to each of the plurality of gate lines GL.

It is illustrated that the plurality of gate lines GL disposed in the display panel 110 are disposed in the first direction (or row direction), and the plurality of data lines DL are disposed in the second direction (or column direction) crossing the first direction. Thus, it is assumed that the data driving circuit 120 is disposed at the upper side of the display panel 110, and the gate driving circuit GD is disposed at the left side and the right side of the display panel 110.

The plurality of gate lines GL disposed on the display panel 110 may include a plurality of first gate control lines, a plurality of second gate control lines, and a plurality of third gate control lines. The first gate control line, the second gate control line, and the third gate control line are wires transmitting different types of gate signals to gate electrodes of the different transistors. For example, the first gate control line may be a wire for transmitting a first emission control signal, the second gate control line may be a wire for transmitting a second emission control signal, and the third gate control line may be a wire for transmitting a scan signal.

Accordingly, the gate driving circuit GD may include a plurality of first emission control driving circuits configured to output first emission control signals to the first gate control line of the gate line GL, a plurality of second emission control driving circuits configured to output second emission control signals to the second gate control line, and a plurality of scan driving circuits configured to output scan signals to the third gate control line.

A period in which the gate signal including the first and second emission control signals and the scan signal and the data signal are applied once to all the pixels PX disposed in the second direction (or column direction) of the display area DA may be referred to as one frame period. The one frame period may be divided into a scan period in which data of each of the gate lines GL connected the pixels PX is scanned and the data of input image is written to each of the pixels PX, and a light emission period in which the pixels PX are turned on according to the first and second emission control signals after the scan period. In the light emission period, the pixels PX may be repeatedly turned on and off. The scan period may include an initialization period, a sampling period, and the like. The sampling period may include a programming period. During the scan period, nodes included in the pixel driving circuit are initialized, the compensation of the threshold voltage of the driving transistor is performed, and the charging of the data voltage is performed. During the light emission period, the light emitting operation is performed. The scan period is only a few horizontal scan periods, and the light emission period occupies most of the one frame period.

Figure 2:
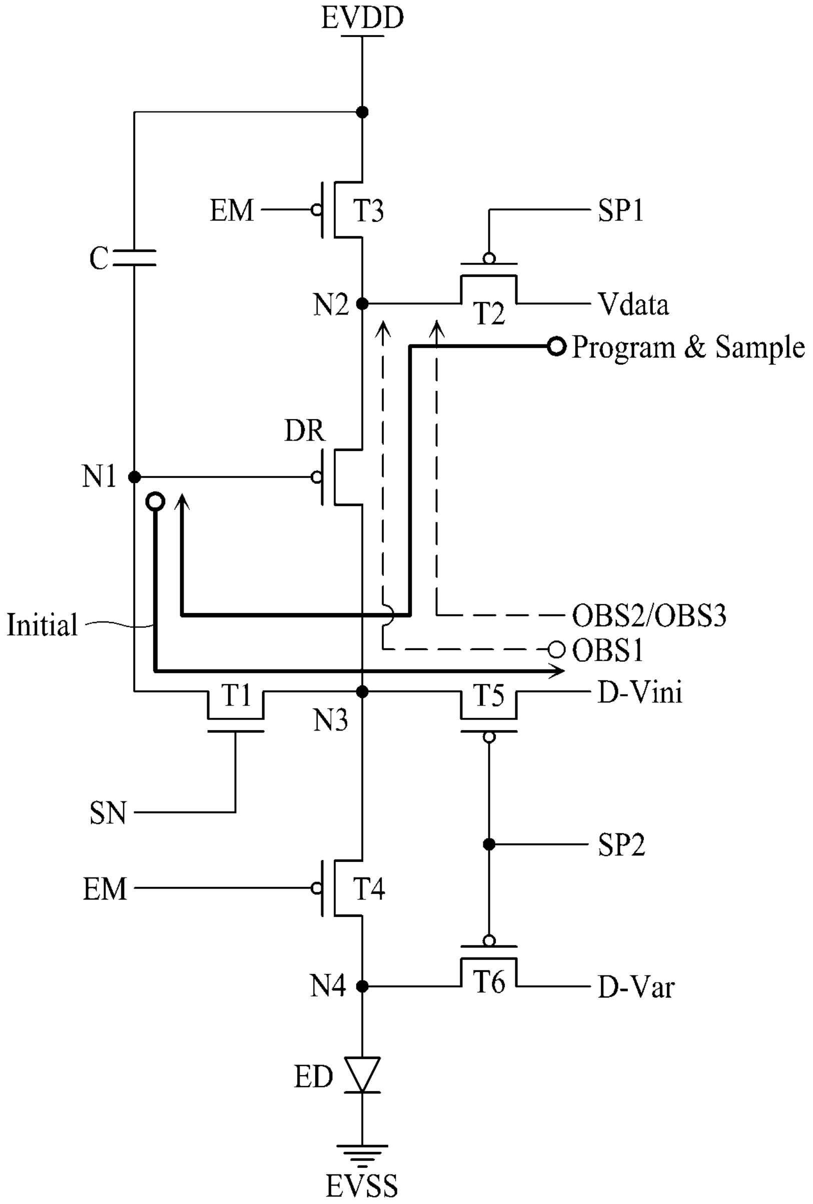
FIG. 2 is a circuit diagram of a pixel driving circuit and a light emitting element according to the embodiment of the present disclosure.

FIG. 2 is a circuit diagram of a pixel driving circuit and a light emitting element according to the embodiment of the present disclosure.

Referring to FIG. 2, the pixel driving circuit according to the embodiment of the present disclosure may include a light emitting element ED, a plurality of transistors, and a capacitor.

As shown in FIG. 2, the pixel driving circuit may be composed of 7T1C, but not limited thereto. The transistor disposed in the pixel driving circuit may be a P-type transistor, but not limited thereto. For example, the pixel driving circuit may be configured with an N-type transistor or a P-type and N-type combined transistor.

The pixel driving circuit may include a driving transistor DR for supplying a driving current to the light emitting element ED, first, second, third, fourth, fifth and sixth transistors T1, T2, T3, T4, T5, and T6, (namely, first to sixth transistors) and a storage capacitor C.

The light emitting element ED may include a first electrode (anode electrode or pixel electrode) and a second electrode (cathode electrode or common electrode). The first electrode may correspond to a fourth node N4 or may be connected to the fourth node N4. A second driving voltage EVSS (or common voltage), which is a low-potential voltage, may be applied to the second electrode. For example, the light emitting element ED may be disposed between the fourth node N4 and a line applied with the second driving voltage EVSS and may be electrically connected thereto. For example, the light emitting element ED may be an organic light emitting diode OLED, a light emitting diode LED, or a quantum dot light emitting diode QLED.

The driving transistor DR may be connected to a first node N1, a third node N3, and a second node N2, and may be controlled according to the voltage of the second node N2. The driving transistor DR may include a gate electrode, a first source/drain electrode, and a second source/drain electrode. The gate electrode (or gate node) of the driving transistor DR may be connected to the first node N1, the first source/drain electrode may be connected to the second node N2, and the second source/drain electrode may be connected to the third node N3. For example, the first driving voltage EVDD which is a high potential voltage, may be applied to the first source/drain electrode of the driving transistor DR. The second source/drain electrode of the driving transistor DR may be electrically connected to the first electrode (or anode electrode) of the light emitting element ED. The driving transistor DR may be a P-type thin film transistor.

The first transistor T1 may be controlled by a first control signal SN and may be connected between the first node N1 and the third node N3. The first transistor T1 may electrically connect the first node N1 and the third node N3 to each other when the first control signal SN is applied to the first transistor T1. The first transistor T1 may be an N-type thin film transistor.

The second transistor T2 may be controlled by a second control signal SP1 and may be connected between the second node N2 and a line to which the data voltage Vdata is applied. When the second control signal SP1 is applied to the second transistor T2, the second transistor T2 may apply the data voltage Vdata to the second node N2. The second transistor T2 may be a P-type thin film transistor.

The third transistor T3 may be controlled by the emission control signal EM, and may be connected between a line to which the first driving voltage EVDD is applied and the second node N2. When the emission control signal EM is applied to the third transistor T3, the third transistor T3 may apply the first driving voltage EVDD to the second node N2. The third transistor T3 may be a P-type thin film transistor.

The fourth transistor T4 may be controlled by the emission control signal EM and may be connected between the third node N3 and the fourth node N4. The fourth transistor T4 may connect the third node N3 and the fourth node N4 to each other when the emission control signal EM is applied. The fourth transistor T4 may be a P-type thin film transistor.

The fifth transistor T5 may be controlled by a third control signal SP2, and may be connected between the third node N3 and a line to which the initialization voltage D-Vini is applied. When the third control signal SP2 is applied to the fifth transistor T5, the fifth transistor T5 may apply the initialization voltage D-Vini to the third node N3. The fifth transistor T5 may be a P-type thin film transistor.

The sixth transistor T6 may be controlled by the third control signal SP2 and may be connected between the fourth node N4 and a line to which an anode reset voltage D-Var is applied. When the third control signal SP2 is applied to the sixth transistor T6, the sixth transistor T6 may apply the anode reset voltage D-Var to the fourth node N4. The sixth transistor T6 may be a P-type thin film transistor.

The storage capacitor C may be connected between the second node N2 and a line to which the first driving voltage EVDD is applied. The storage capacitor C may store and maintain the data voltage Vdata during one frame.

Figure 3:
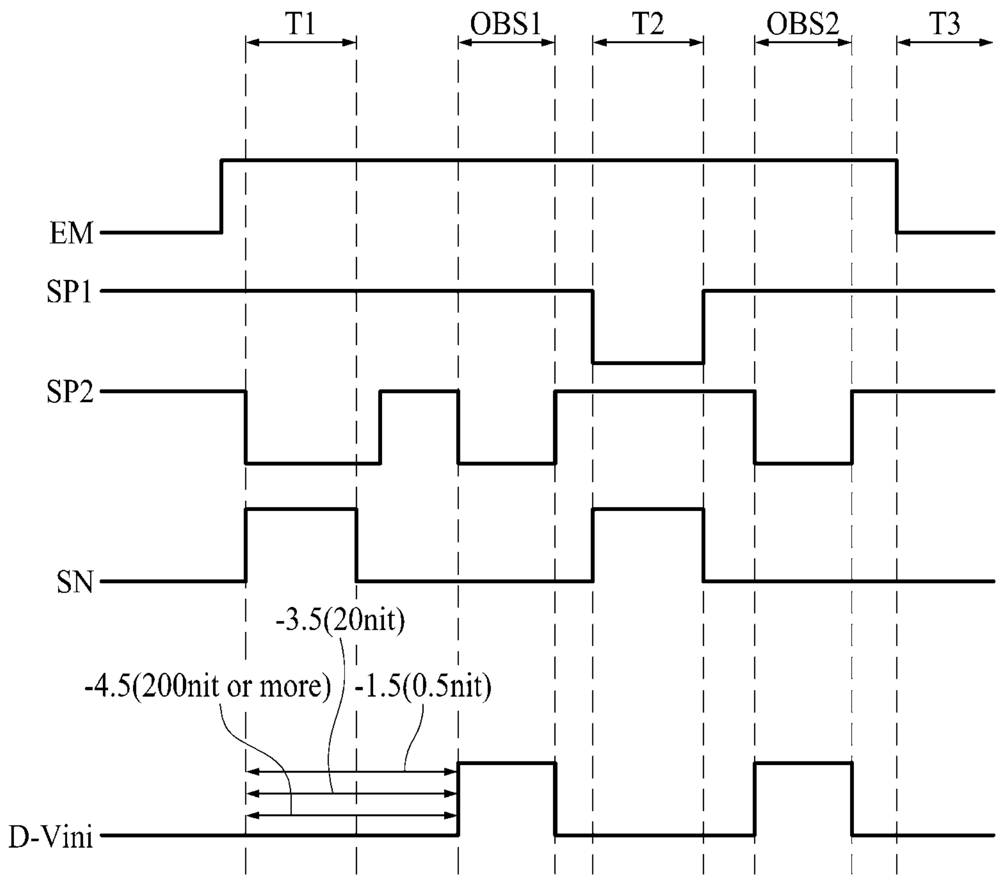
FIG. 3 is a waveform diagram of gate signals and an applied voltage of a pixel driving circuit according to the embodiment of the present disclosure.
Figure 4A:
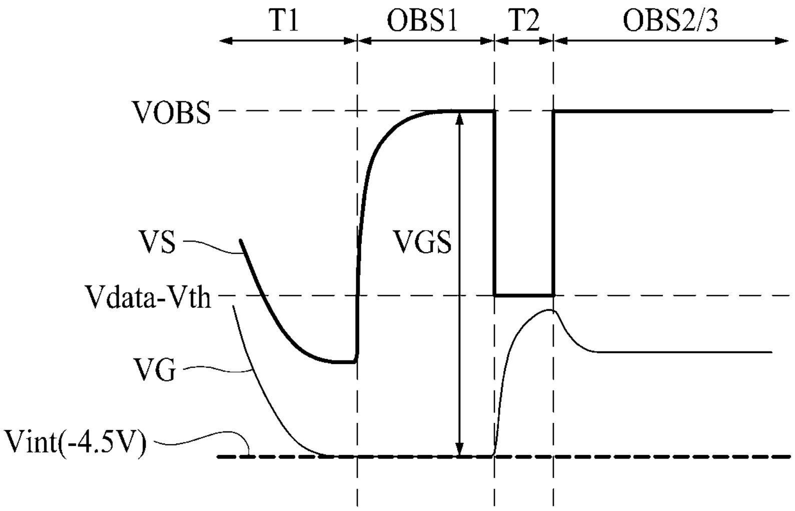
FIGS. 4A to 4C are diagrams illustrating a signal voltage of a pixel driving circuit according to the embodiment of the present disclosure.
Figure 4B:
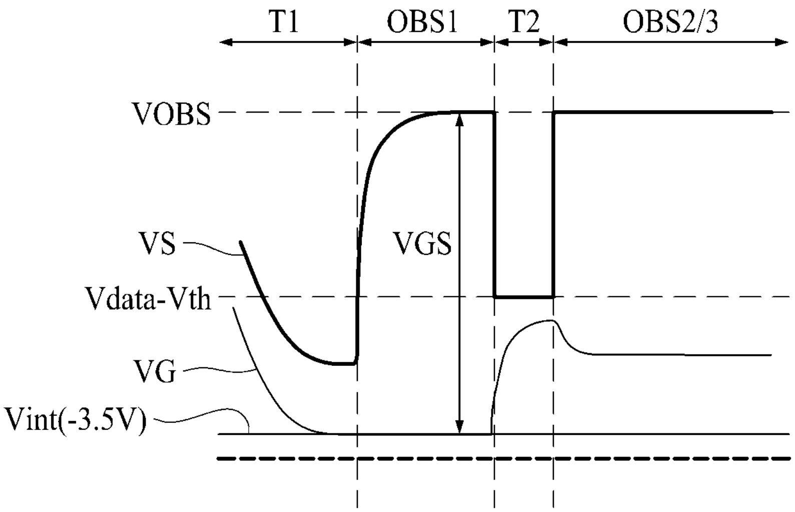
Figure 4C:
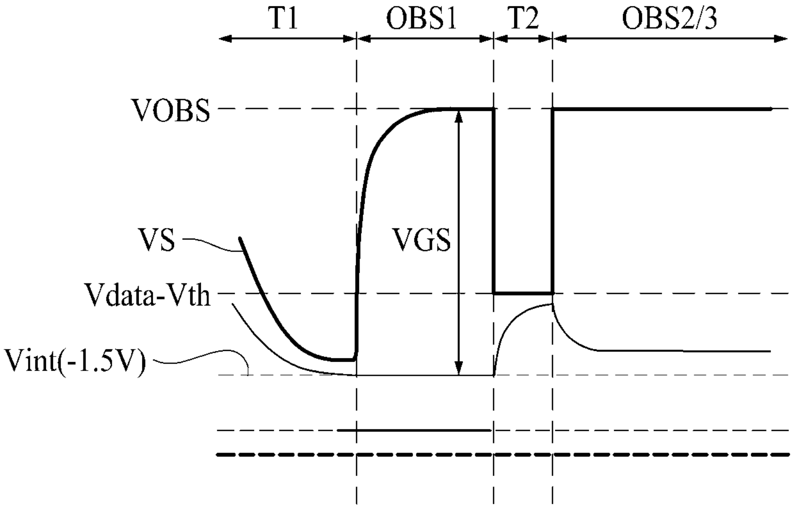

FIG. 3 is a waveform diagram of gate signals and an applied voltage of the pixel driving circuit according to the embodiment of the present disclosure. FIGS. 4A to 4C are diagrams illustrating a signal voltage of the pixel driving circuit according to the embodiment of the present disclosure.

Referring to FIG. 3 in connection with FIG. 2, the driving of the pixel driving circuit according to the embodiment of the present disclosure may include an initialization period T1, a sampling period T2, and an emission period T3. Also, at least one on-bias stress period (hereinafter, referred to as 'OBS') may be further included during any one frame.

The gate signals input to the pixel driving circuit may include the first control signal SN, the second control signal SP1, the third control signal SP2, and the emission control signal EM.

The first control signal SN may have the first voltage level in the initialization period T1 and the sampling period T2. Since the first control signal SN applies the signal to the first transistor T1 corresponding to the N-type thin film transistor, the first control signal SN may be the gate-on voltage when the first control signal SN has the first voltage level.

The second control signal SP1 may have the second voltage level lower than the first voltage level in the sampling period T2. Since the second control signal SP1 applies the signal to the second transistor T2 corresponding to the p-type thin film transistor, the second control signal SP1 may be the gate-on voltage when the voltage level has the second voltage level.

The third control signal SP2 may have the second voltage level in the initialization period T1 and the at least one OBS period. Since the third control signal SP2 applies the signal to the fifth transistor T5 and the sixth transistor T6 corresponding to the P-type thin film transistors, the third control signal SP2 may be the gate-on voltage when the voltage level has the second voltage level.

The emission control signal EM may have the second voltage level in the emission period T3. Since the emission control signal EM applies the signal to the third transistor T3 and the fourth transistor T4 corresponding to the P-type thin film transistors, the emission control signal EM may be the gate-on voltage when the voltage level has the second voltage level.

During the initialization period T1, the first control signal SN may be changed to the first voltage level, and the third control signal SP2 may be changed to the second voltage level. At this time, the second control signal SP1 and the emission control signal EM may be maintained in the state of the first voltage level. Accordingly, the first transistor T1 controlled by the first control signal SN may be turned on. The fifth transistor T5 and the sixth transistor T6, which are controlled by the third control signal SP2, may be turned on. The initialization voltage D-Vini may be applied to the first node N1 through the first transistor T1 and the fifth transistor T5, and the anode reset voltage D-Var may be applied to the fourth node N4 by the sixth transistor T6.

According to the embodiment of the present disclosure, the initialization voltage D-Vini applied in the initialization period T1 may be varied, that is set to a selected value each time and then supplied. The initialization voltage may be set through an image analysis algorithm for analyzing the input image data. The initialization voltage is determined using the techniques set forth herein and then is set to be the valued that is appropriate for the correct amount of light to be emitted. Thus, the value may vary (namely be different) from one turn on time to another turn on time for different data pulses that are applied at different times.

For example, when the grayscale value of the image data is 450 nit, the initialization voltage may be set to −4.5V. When the grayscale value of the image data is 200 nit, the initialization voltage may be set to −4V. When the grayscale value of the image data is 20 nit, the initialization voltage may be set to −3.4V. When the grayscale value of the image data is 0.5 nit, the initialization voltage may be set to −1.5V. However, the present specification is not limited to this specific value, and may be variously set according to specifications of the display device.

According to the embodiment of the present disclosure, the initialization voltage applied to the initialization period T1 varies according to the grayscale of the image data so that it is possible to overcome a flicker phenomenon when a screen is implemented with a low grayscale. In detail, when an OGS voltage for each luminance is used in the same manner, a deviation of a gate-source voltage VGS of the driving transistor DR occurs, whereby a flicker phenomenon may occur. In order to reduce the deviation of the gate-source voltage VGS of the driving transistor DR, the initialization voltage Vini may be changed to be high as it goes to the low grayscale level. The flicker phenomenon is sensitive to the low grayscale level. Accordingly, it is possible to reduce the deviation of the gate-source voltage VGS of the driving transistor DR for each luminance and to overcome the flicker phenomenon by varying the initialization voltage Vini to the low grayscale level at different times.

For example, as illustrated in FIG. 4A, when the grayscale value of the image data is 200 nit or more, the initialization voltage may be set to −4.5V, whereby the gate-source voltage VGS of the driving transistor DR may increase, thereby overcoming the flicker phenomenon.

For example, as illustrated in FIG. 4B, when the grayscale value of the image data is the initialization voltage may be set to −3.5V, whereby the gate-source voltage VGS of the driving transistor DR may increase, thereby overcoming the flicker phenomenon.

For example, as illustrated in FIG. 4C, when the gray level of the image data is 0.5 nit, the initialization voltage may be set to −1.5V, whereby the gate-source voltage VGS of the driving transistor DR increases, thereby overcoming the flicker phenomenon.

According to the embodiment of the present disclosure, since the initialization voltage may be selected according to the grayscale of the image data, regardless of the gate-source voltage VGS of the driving transistor DR, it is possible to drive the device at the optimal threshold voltage Vth of the driving transistor DR for each grayscale level of the image, thereby maintaining the appropriate gate-source voltage VGS capable of overcoming the flicker phenomenon, namely, the initialization voltage may have different values and thus will vary from one data drive time to another data drive time.

The first OBS period OBS1 may be subsequently performed after the initialization period T1 is performed. During the period of OBS1, the third control signal SP2 may be changed to the second voltage level. Accordingly, the fifth transistor T5 controlled by the third control signal SP2 may be turned-on, whereby the OBS voltage may be applied to the second node N2. The initialization voltage and the OBS voltage are selected and applied according to the driving period to the source node of the fifth transistor T5 and thus vary.

When the image data is at the high grayscale level in the operation of the pixel driving circuit, the gate-source voltage VGS of the driving transistor DR may be increased, and the threshold voltage Vth of the driving transistor DR may also increase. On the other hand, when the image data is at the low grayscale level, the threshold voltage Vth of the driving transistor DR may be set to the relatively lower value than the high grayscale level.

According to the embodiment of the present disclosure, the OBS period is performed after the initialization period T1. Thus, in case of the image data at the high grayscale level, when the fixed initialization voltage is applied in the initialization period T1, it has no large influence thereon. However, in case of the image data at the low grayscale level, the low grayscale level may be adversely affected while the gate-source voltage VGS of the driving transistor DR is large.

According to the embodiment of the present disclosure, the pixel driving circuit changes the initialization voltage applied in the initialization period T1, which is performed before the OBS period, to the value set according to the grayscale of the image data, and applies the changed value, to thereby overcome the flicker phenomenon at the low grayscale level.

During the sampling period T2, the second control signal SP1 may be changed to the second voltage level, and the first control signal SN may be changed to the first voltage level. Accordingly, the first transistor T1 and the second transistor T2 controlled by the first control signal SN and the second control signal SP1 may be turned-on, whereby the data voltage Vdata may be applied to the first node N1.

After performing the sampling period T2, in order to mitigate the hysteresis phenomenon of the driving transistor DR, the second OBS period OBS2 may be performed. During the second OBS period OBS2, the third control signal SP2 may be changed to the second voltage level. Accordingly, the fifth transistor T5 is turned-on, whereby the OBS voltage may be applied to the second node N2.

Thereafter, the emission control signal EM may be changed to the second voltage level in the emission period T3. Accordingly, the third transistor T3 and the fourth transistor T4, which are controlled by the emission control signal EM, may be turned-on, and the driving current controlled by the driving transistor DR may be supplied to the light emitting element ED, to thereby emit light.

Figure 5:
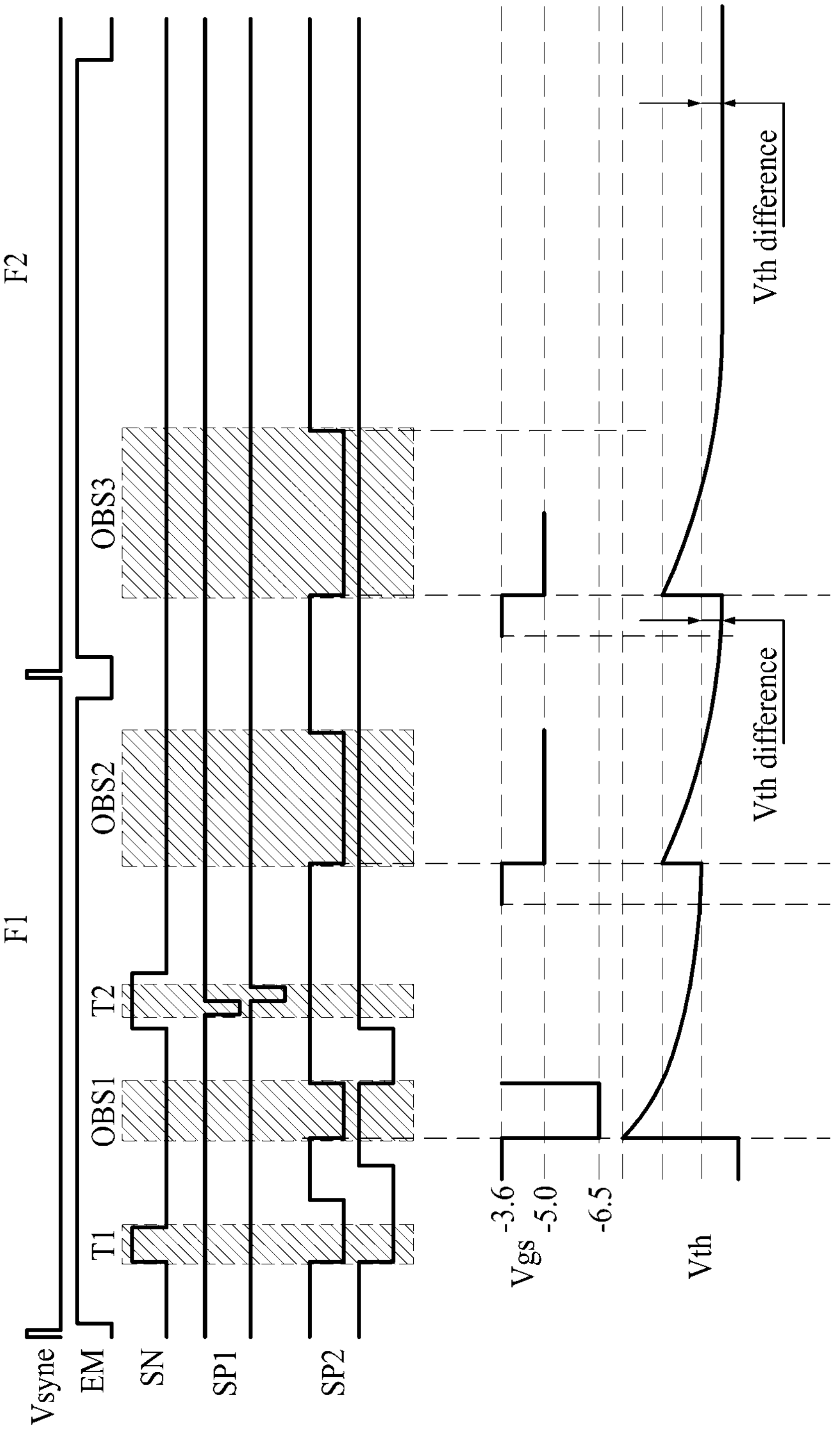
FIG. 5 is a waveform diagram of gate signals and an applied voltage of a pixel driving circuit according to the embodiment of the present disclosure.

FIG. 5 is a waveform diagram of gate signals and an applied voltage of a pixel driving circuit according to the embodiment of the present disclosure.

Referring to FIG. 5, after the sampling period T2 of the pixel driving circuit according to one embodiment of the present disclosure, when the synchronization between the second OBS period OBS2 of the first frame F1 and the third OBS period OBS3 of the second frame F2 is not performed, the difference in the threshold voltage Vth of the driving transistor DR may occur at the time when the emission period T3 is started.

Figure 6:
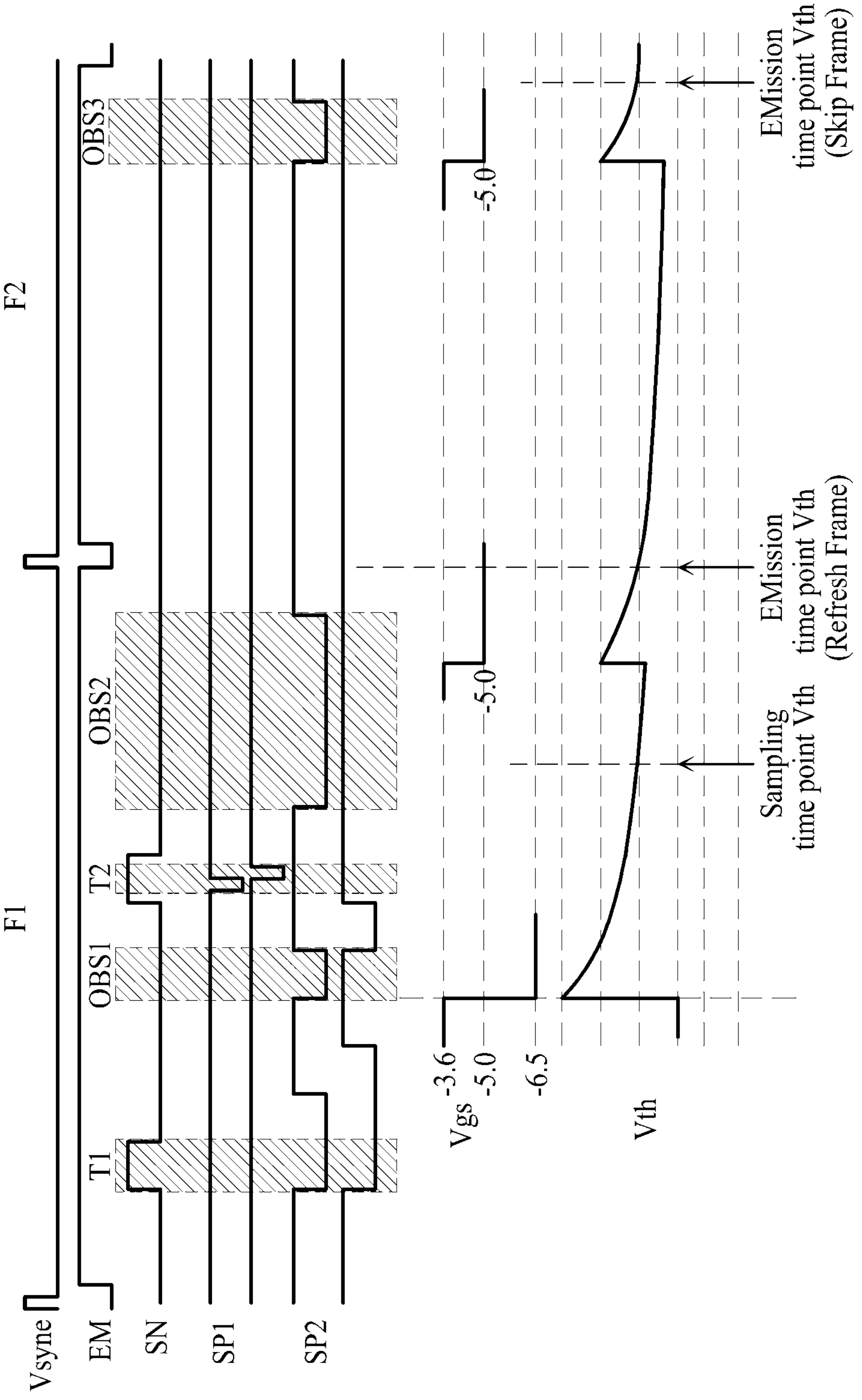
FIG. 6 is a waveform diagram of gate signals and an applied voltage of a pixel driving circuit according to the embodiment of the present disclosure.
Figure 7:
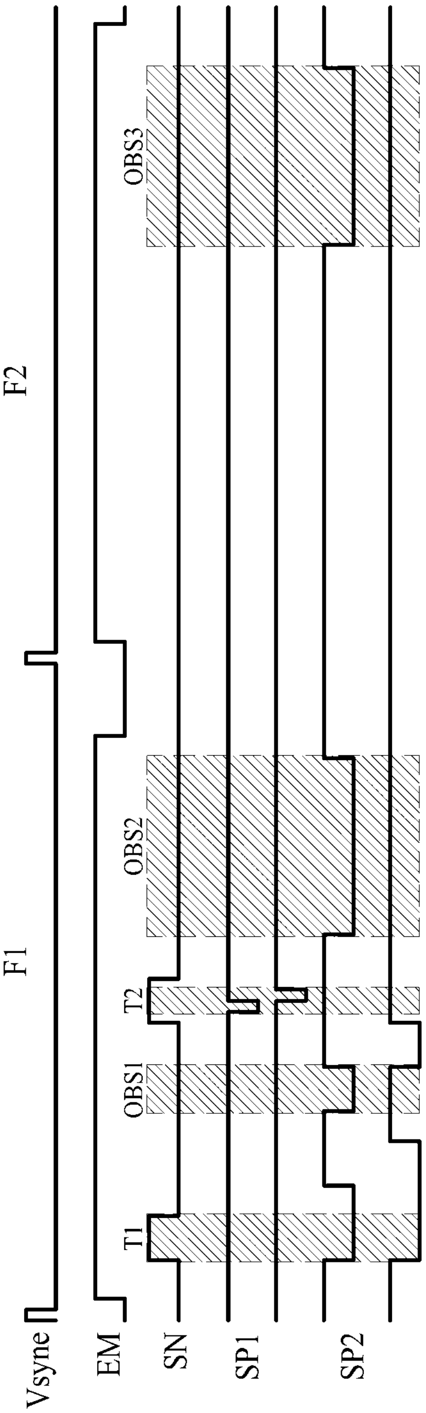
FIG. 7 is a waveform diagram of gate signals of a pixel driving circuit according to the embodiment of the present disclosure.
Figure 8:
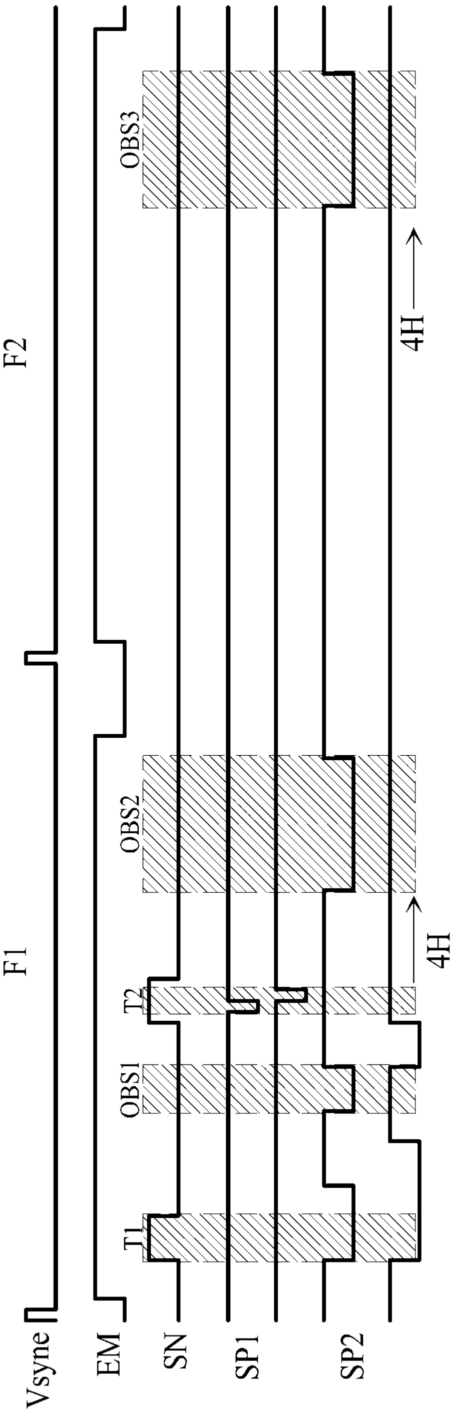
FIG. 8 is a waveform diagram of gate signals of a pixel driving circuit according to the embodiment of the present disclosure.
Figure 9:
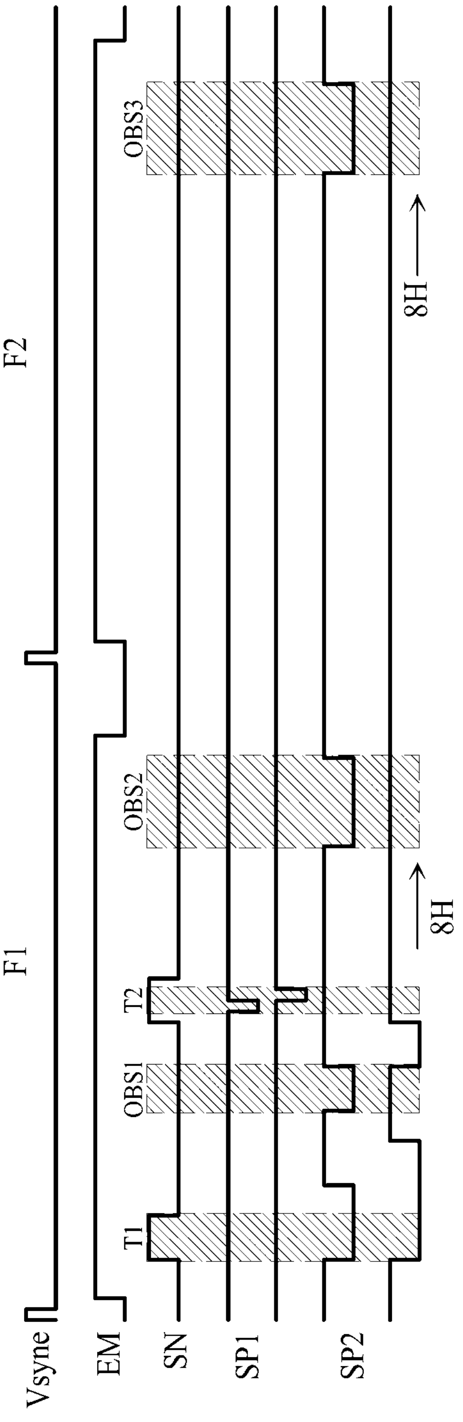
FIG. 9 is a waveform diagram of gate signals of a pixel driving circuit according to the embodiment of the present disclosure.

FIG. 6 is a waveform diagram of gate signals and an applied voltage of a pixel driving circuit according to the embodiment of the present disclosure. FIG. 7 is a waveform diagram of gate signals of a pixel driving circuit according to the embodiment of the present disclosure. FIG. 8 is a waveform diagram of gate signals of a pixel driving circuit according to the embodiment of the present disclosure. FIG. 9 is a waveform diagram of gate signals of a pixel driving circuit according to the embodiment of the present disclosure.

Referring to FIG. 6, the pixel driving circuit according to the embodiment of the present disclosure may reduce the difference of threshold voltage Vth of the driving transistor DR at the time when the emission period T3 is started through the synchronization between the second OBS period OBS2 of the first frame F1 and the third OBS period OBS3 of the second frame F2.

According to another embodiment of the present disclosure, the OBS period of the pixel driving circuit may be set in consideration of the threshold voltage Vth of the driving transistor DR.

The pixel driving circuit may perform the synchronization between the second OBS period OBS2 of the first frame F1 and the third OBS period OBS3 of the second frame F2 in various ways. For example, as illustrated in FIG. 7, the second OBS period OBS2 of the first frame F1 may be synchronized only with the time point of the third OBS period OBS3. For example, as illustrated in FIG. 8, the second OBS period OBS2 of the first frame F1 may be synchronized with the start point of the third OBS period OBS3, and the second OBS period OBS2 and the third OBS period OBS3 may be delayed backward by 4H. For example, as illustrates in FIG. 9, the second OBS period OBS2 of the first frame F1 is synchronized with the start point of the third OBS period OBS3, and the second OBS period OBS2 and the third OBS period OBS3 may be delayed backward by 8H. However, the present specification is not necessarily limited thereto. In consideration of the threshold voltage of the thin film transistor DR, the second OBS period and the third OBS period may be changed in various ways. Accordingly, it is possible to reduce the deviation of the threshold voltage regardless of the change in the gate-source voltage VGS of the driving transistor DR according to the appropriate setting of the OBS time point.

The display device according to the embodiment of the present disclosure may be described as follows.

The display device according to an embodiment of the present disclosure may include a light emitting element, and a pixel driving circuit connected to the light emitting element and configured to include first, second, third and fourth nodes, (namely, first to fourth nodes) the pixel driving circuit may include a driving transistor connected to the first to third nodes, a first transistor connected to a first control signal line and connected to the first node and the third node, a second transistor connected to a second control signal line and connected between the second node and a data line, a third transistor connected to an emission control signal line and connected between the second node and a first driving voltage line, a fourth transistor connected to the emission control signal line and connected between the third node and the fourth node, a fifth transistor connected to a third control signal line and connected between the third node and a first initialization voltage line, a sixth transistor connected to the third control signal line and connected between the fourth node and a second initialization voltage line, and a storage capacitor disposed between the first driving voltage line and the first node, an initialization voltage applied through the first initialization voltage line may be varied, namely be a different selected value, based on a data voltage applied through the data line.

In the display device according to an embodiment of the present disclosure, the data voltage may be a voltage generated based on an actual image.

In the display device according to an embodiment of the present disclosure, the data voltage may be a voltage set according to a grayscale of the actual image.

In the display device according to an embodiment of the present disclosure, the initialization voltage may increase as the data voltage becomes a low grayscale level.

In the display device according to an embodiment of the present disclosure, at least one of the first to sixth transistors and the driving transistor may have a different type from other transistors.

In the display device according to an embodiment of the present disclosure, the first transistor may be an N-type transistor.

In the display device according to an embodiment of the present disclosure, the second to sixth transistors and the driving transistor may be P-type transistors.

In the display device according to an embodiment of the present disclosure, the pixel driving circuit may be driven in an initialization period, a sampling period, and an emission period, in the initialization period, the first control signal may have a first voltage level, and the third control signal may have a second voltage level lower than the first voltage level.

In the display device according to an embodiment of the present disclosure, in the initialization period, the initialization voltage may be applied to the first node.

In the display device according to an embodiment of the present disclosure, after the initialization period, an on-bias stress period for applying the initialization voltage to the second node may be performed.

In the display device according to an embodiment of the present disclosure, an initialization voltage applied in the on-bias stress period may be varied based on an image data analysis.

In the display device according to an embodiment of the present disclosure, the pixel driving circuit may include at least one on-bias stress period in one frame period.

In the display device according to an embodiment of the present disclosure, the on-bias stress period may be performed after the sampling period.

In the display device according to an embodiment of the present disclosure, the at least one on-bias stress period may include a first on-bias stress period performed after the initialization period, and a second on-bias stress period performed after the sampling period.

In the display device according to an embodiment of the present disclosure, the second on-bias stress period may be performed at various performing points between the sampling period and the emission period.

In the display device according to an embodiment of the present disclosure, the second on-bias stress period may be set based on a threshold voltage of the driving transistor.

In the display device according to an embodiment of the present disclosure, may further include a third on-bias stress period performed in a next frame period adjacent to the one frame period.

In the display device according to an embodiment of the present disclosure, the third on-bias stress period may be synchronized with a time point of the second on-bias stress period of the previous frame.

In the display device according to an embodiment of the present disclosure, the third on-bias stress period may be synchronized based on the change in the second on-bias stress period.

The display device comprising the pixel driving circuit according to the present disclosure may reduce the deviation of the threshold voltage regardless of the gate-source voltage VGS of the driving transistor by the on-bias stress operation and may overcome the flicker characteristic at the low grayscale level by using the optimal initialization voltage for each grayscale level according to the image data and optimizing the operation time point of the on-bias stress.

It will be apparent to those skilled in the art that various substitutions, modifications, and variations are possible within the scope of the present disclosure without departing from the spirit and scope of the present disclosure. All range and equivalent concepts of the claims should be interpreted as being included in the scope of the present disclosure.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a light emitting element; and a pixel driving circuit connected to the light emitting element and configured to include first, second, third and fourth nodes, wherein the pixel driving circuit includes:

a driving transistor connected to the first, second and third nodes;

a first transistor connected to a first control signal line and connected to the first node and the third node;

a second transistor connected to a second control signal line and connected between the second node and a data line;

a third transistor connected to an emission control signal line and connected between the second node and a first driving voltage line;

a fourth transistor connected to the emission control signal line and connected between the third node and the fourth node;

a fifth transistor connected to a third control signal line and connected between the third node and a first initialization voltage line;

a sixth transistor connected to the third control signal line and connected between the fourth node and a second initialization voltage line; and a storage capacitor disposed between the first driving voltage line and the first node, wherein the value of an initialization voltage applied through the first initialization voltage line is varied based on a data voltage applied through the data line, wherein the pixel driving circuit is driven in an initialization period, a sampling period, and an emission period, wherein, in the initialization period, the first control signal has a first voltage level, and the third control signal has a second voltage level lower than the first voltage level, and wherein, after the initialization period, there is at least one on-bias stress period during which an initialization voltage is applied to the second node.

2. The display device according to claim 1, wherein the data voltage is a voltage generated based on an actual image.

3. The display device according to claim 2, wherein the data voltage is a voltage set according to a grayscale of the actual image.

4. The display device according to claim 1, wherein the initialization voltage increase as the data voltage becomes a low grayscale level.

5. The display device according to claim 1, wherein at least one of the first to sixth transistors and the driving transistor has a different type from other transistors.

6. The display device according to claim 5, wherein the first transistor is an N-type transistor.

7. The display device according to claim 5, wherein the second to sixth transistors and the driving transistor are P-type transistors.

8. The display device according to claim 1, wherein, in the initialization period, the initialization voltage is applied to the first node.

9. The display device according to claim 1, wherein an initialization voltage applied in the at least one on-bias stress period is determined based on an image data analysis.

10. The display device according to claim 1, wherein the pixel driving circuit includes the at least one on-bias stress period in one frame period.

11. The display device according to claim 10, wherein the at least one on-bias stress period is performed after the sampling period.

12. The display device according to claim 10, wherein the at least one on-bias stress period includes:

a first on-bias stress period performed after the initialization period; and a second on-bias stress period performed after the sampling period.

13. The display device according to claim 12, wherein the second on-bias stress period is performed at various performing points between the sampling period and the emission period.

14. The display device according to claim 13, wherein the second on-bias stress period is set based on a threshold voltage of the driving transistor.

15. The display device according to claim 14, wherein the third on-bias stress period is synchronized based on the change in the second on-bias stress period.

16. The display device according to claim 12, further comprising a third on-bias stress period performed in a next frame period adjacent to the one frame period.

17. The display device according to claim 16, wherein the third on-bias stress period is synchronized with a time point of the second on-bias stress period of the previous frame.

* * * * *